Nov. 10, 1959  A. L. KUHLMAN  2,912,134
DRINKING CUP CONSTRUCTION
Filed Sept. 5, 1956

INVENTOR.
Arthur L. Kuhlman.
BY
*Fearman & Fearman*
ATTORNEYS

United States Patent Office 2,912,134
Patented Nov. 10, 1959

2,912,134

DRINKING CUP CONSTRUCTION

Arthur L. Kuhlman, Anchorville, Mich.

Application September 5, 1956, Serial No. 608,156

5 Claims. (Cl. 220—20)

This invention relates to a drinking cup construction and more particularly to a construction of the kind adapted to contain simultaneously two different fluids which either may be maintained separate from one another or mixed together in accordance with the wishes of the user.

When a customer orders a beverage such as coffee in a restaurant or the like, the coffee usually is served black and is accompanied by a separate container of cream which the customer may use, or not use, as he desires. The necessity of providing a separate container for cream is objectionable for a number of reasons such as requiring the server to handle two objects, not only at the time of serving the customer, but also in clearing the table off and washing the used dishes. The handling of an unnecessary plurality of objects not only is difficult, but also may require more time since the number of articles which can be carried by a server is limited.

An object of the invention is to provide a cup construction in which two different liquids selectively may be maintained separate from one another or mixed together in accordance with the wishes of the user.

Another object of the invention is to provide an integral cup construction in which there are two separate compartments for containing different liquids, the compartments being so constructed as to enable the contents of one to be admixed with the contents of the other upon tipping of the cup in a predetermined direction.

A further object of the invention is to provide a cup construction of the kind referred to in which tipping of the cup by the user in a direction to drink the contents will enable one compartment to be drained without draining the contents of the other compartment, but in which tipping of the cup by the user in another direction will enable the contents of the two chambers to be mixed.

Other objects and advantages of the invention will be pointed out specifically or will become apparent from the following description of the apparatus when considered in conjunction with the appended claims and the accompanying drawing, in which:

Figure 1:
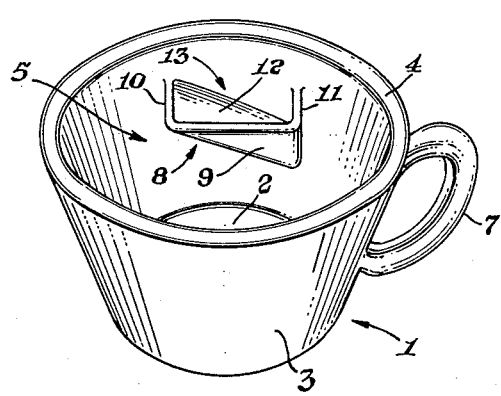
Figure 1 is a perspective view of a cup constructed in accordance with the invention.
Figure 3:
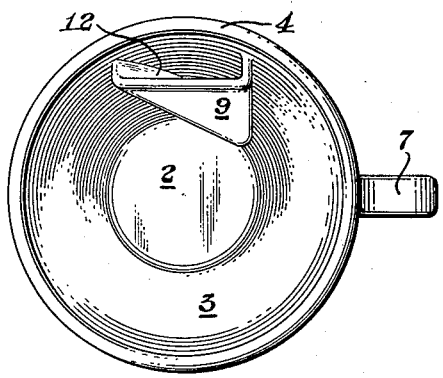
Figure 3 is a top plan view of the cup.

A cup constructed in accordance with the invention is designated in the drawing generally by the numeral 1 and comprises a base 2 from the periphery of which extends an upstanding, continuous wall 3 terminating in a rim or the like 4 to form a main compartment 5 into which coffee or other liquids indicated by the numeral 6 may be poured. At one side of the wall 3 a handle 7 may be fused or otherwise suitably secured in a conventional manner. The material from which the base 2, the wall 3, and the handle 7 is made may be china, glass, or any of the other materials from which drinking cups are made, and the shape of the cup may be either frusto-conical, as shown in the drawing, or any other conventional shape.

Figure 4:
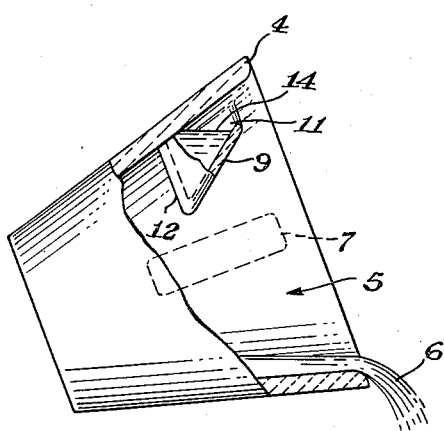
Figure 4 is a view similar to Figure 2, but showing the cup rotated 90° and tipped in a direction to permit one to drink the contents.

Within the main compartment 5 and adjacent to the rim or upper edge of the cup is provided a receptacle or auxiliary compartment 8 comprised of a substantially right triangular plane section 9 having a panel 11 at one of its ends extending in a plane substantially at right angles to the plane of the section 9, the free end of the section 11 being fused or otherwise suitably secured to the inside surface of the cup wall 3, thereby spacing the section 9 from the wall 3. From the lower edge of the wall section 11 extends a base panel or section 12 which is fused to the downwardly facing hypotenuse of the wall section 9 and to the cup wall 4 to form an upwardly slanting base for the receptacle 8 terminating in a pouring lip 10, the arrangement of the sections being such that, in front elevation, the receptacle has the appearance of a wedge (see Figure 2). The material from which the receptacle sections are made will be the same as that constituting the base 2 and the wall 3. As is best shown in Figure 4, the receptacle wall section 9 is so located by the sections 10, 11, and 12 that it slopes from top to bottom away from the cup wall 3. The receptacle 8 is open at its top so as to provide a readily accessible auxiliary or secondary compartment 13 into which cream 14 or the like may be poured.

Figure 2:
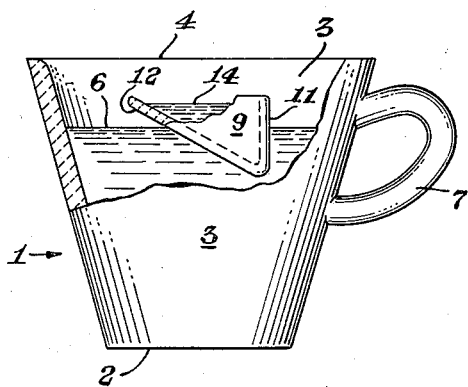
Figure 2 is a view of the cup partly in side elevation and partly in section.

In use, a beverage such as black coffee is poured into the main compartment 5, the level of the coffee being lower than the top of the receptacle 8 as is shown in Figure 2. Cream then may be poured into the receptacle 8 and the cup 1 containing both the coffee and the cream, but separate from one another, may be taken to the customer and placed at the right hand side of the plate (not shown) in accordance with the dictates of convention, i.e., in the position shown in Figure 2. If the customer prefers to drink the coffee black, he grasps the cup handle 7 with his right hand and tips the cup towards himself in the manner indicated in Figure 4 so as to permit the contents of the main compartment 5 to drain. Since the area at the bottom of the receptacle is greater than the area at the top, due to the slope of the receptacle 9, the contents of the compartment 13 will be hindered from draining therefrom when the cup is tipped in the manner shown in Figure 4.

Figure 5:
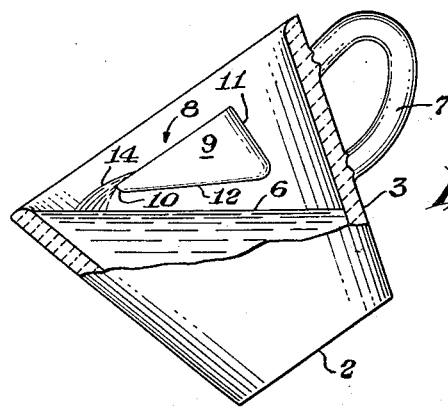
Figure 5 is a view similar to Figure 2, but showing the cup tipped in a direction to mix the contents of the two compartments.

Alternatively, if one desires to mix the contents of the two compartments, the cup 1 may be tipped counterclockwise from the position shown in Figure 2 to the position shown in Figure 5, whereupon cream 14 or the like will drain from the compartment 13 into the compartment 5 due to the inclination of the base wall 12 of the receptacle. Thereafter, the cup may be tipped in the manner indicated in Figure 4 to permit the admixed contents to drain.

The disclosed embodiment is representative of a preferred form of the invention, but is intended to be illustrative rather than definitive of the invention. The invention is defined in the claims.

I claim:

1. A drinking cup construction for selectively permitting or preventing the admixing of a plurality of fluids, said construction comprising a base; a continuous, upstanding wall extending from said base to form an open main compartment for containing one of said fluids; and a plurality of wall sections secured one to another and to the inner surface of said wall below and adjacent to the upper edge of the latter to form a second open top compartment for containing another of said fluids, said plurality of wall sections being so arranged relatively to one another and to said wall that tipping of the cup in one direction facilitates the flowing of the contents of said second compartment into said main compartment, but tipping of the cup in any other direction hinders the flowing of the contents of said second compartment into said main compartment, said plurality of wall sections comprising a side panel, a substantially vertical end panel secured to said side panel at one end of the latter, and a base panel secured to the lower end of said end panel and to said side panel, said base panel sloping upwardly from said lower end of said end panel.

2. The construction set forth in claim 1 in which said plurality of wall sections includes a substantially right triangularly shaped side panel having its hypotenuse facing towards said base, an end panel at one end of said side panel, and a base panel secured to the lower end of said end panel and to the hypotenuse of said side panel.

3. A drinking cup construction for selectively permitting or preventing the admixing of a plurality of fluids, said construction comprising a base; a continuous upstanding wall extending from said base to form an open main compartment for containing one of said fluids; and a plurality of wall sections secured one to another and to the inner surface of said wall adjacent to the upper edge of the latter to form a second open top compartment for containing another of said fluids, said plurality of wall sections comprising a substantially right triangularly shaped front panel having its hypotenuse facing towards said base, a base panel secured at one edge to the hypotenuse of said front panel and being substantially coextensive in length with said hypotenuse, the opposite edge of said base panel being secured to said wall, and an end panel secured at one of its ends to said base panel and at one of its sides to said front panel, said end panel being of such shape that the front panel is located farther away from said wall along its hypotenuse than elsewhere.

4. A drinking cup construction for selectively permitting or preventing the admixing of a plurality of fluids comprising an open top main compartment and an open top auxiliary compartment within said main compartment, said main compartment comprising a base from which extends a continuous upstanding wall, said auxiliary compartment being composed in part by a portion of said upstanding wall and in part by a plurality of side panels secured to said continuous wall and to one another, said auxiliary compartment also including a base panel secured to each of said side panels and to said upstanding wall, said base panel sloping upwardly from one end thereof to the other and terminating in a pouring lip.

5. The construction set forth in claim 4 wherein the base panel of said auxiliary compartmnt is greater in area than the open top of auxiliary compartment.

References Cited in the file of this patent

UNITED STATES PATENTS

| | | |
|---|---|---|
| D. 101,290 | Schneider | Sept. 22, 1936 |
| D. 101,721 | Spinelli et al. | Oct. 27, 1936 |
| 111,281 | Walker | Jan. 24, 1871 |
| 265,612 | Johnston | Oct. 10, 1882 |
| 377,306 | Illoway | Jan. 31, 1888 |
| 621,188 | Warner | Mar. 14, 1899 |
| 1,941,327 | Turner | Dec. 26, 1933 |
| 1,948,932 | McMickle | Feb. 27, 1934 |
| 2,026,449 | Ward | Dec. 31, 1935 |
| 2,030,975 | Fairchild | Feb. 18, 1936 |
| 2,215,691 | East | Sept. 24, 1940 |
| 2,327,078 | Teetor | Aug. 17, 1943 |